United States Patent
Yang et al.

(10) Patent No.: US 9,432,984 B2
(45) Date of Patent: Aug. 30, 2016

(54) METHOD OF SENDING/RECEIVING CONTROL INFORMATION AND DEVICE THEREFOR

(71) Applicant: LG ELECTRONICS INC., Seoul (KR)

(72) Inventors: Suckchel Yang, Gyeonggi-do (KR); Dongyoun Seo, Gyeonggi-do (KR); Joonkui Ahn, Gyeonggi-do (KR); Hanbyul Seo, Gyeonggi-do (KR); Kijun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 14/362,341

(22) PCT Filed: Jan. 21, 2013

(86) PCT No.: PCT/KR2013/000457
§ 371 (c)(1),
(2) Date: Jun. 2, 2014

(87) PCT Pub. No.: WO2013/109109
PCT Pub. Date: Jul. 25, 2013

(65) Prior Publication Data
US 2014/0341143 A1 Nov. 20, 2014

Related U.S. Application Data

(60) Provisional application No. 61/588,664, filed on Jan. 20, 2012.

(51) Int. Cl.
*H04W 4/00* (2009.01)
*H04W 72/04* (2009.01)
(Continued)

(52) U.S. Cl.
CPC ........ *H04W 72/042* (2013.01); *H04J 11/0053* (2013.01); *H04L 1/0046* (2013.01); *H04L 1/0072* (2013.01); *H04L 5/001* (2013.01); *H04L 5/0035* (2013.01); *H04B 7/024* (2013.01)

(58) Field of Classification Search
None
See application file for complete search history.

(56) References Cited

U.S. PATENT DOCUMENTS

2009/0257449 A1* 10/2009 Chen ............... H04L 1/0041 370/470
2012/0063302 A1* 3/2012 Damnjanovic ... H04W 56/0045 370/228

(Continued)

FOREIGN PATENT DOCUMENTS

KR 10-2010-0084054 A 7/2010
KR 10-2011-0026399 A 3/2011

(Continued)

OTHER PUBLICATIONS

Nokia: "Downlink control enhancements for intra- and inter-cell CoMP", 3GPP TSG-RAN WG1 Meeting #66bis, R1-113147, Oct. 10-14, 2011.

(Continued)

*Primary Examiner* — Kouroush Mohebbi
(74) *Attorney, Agent, or Firm* — Dentons US LLP

(57) ABSTRACT

The present invention relates to a wireless communication system. In particular, the present invention relates to a method and device for receiving control information regarding a coordinated multi-point (CoMP) set including a first cell and a second cell from a serving/transmitting point in a carrier aggregation (CA) based wireless communication system. The present invention includes: receiving information regarding the size of control information through higher-layer signaling; and monitoring a plurality of control channel candidates for each cell of the CoMP set through the first cell in the CoMP set and detecting the control information, wherein the size of information of the control information candidate for each cell is equally determined based on information regarding the size of control information.

12 Claims, 9 Drawing Sheets

* It is assumed that control channel candidates have the same size according to the following method when monitoring the control channel candidate for each cell of CoMP set:
1) Method 1: a maximum size of DCI formats for CoMP cells
2) Method 2: a size of DCI format for CoMP PCell
3) Method 3: higher layer signaling

(51) Int. Cl.
*H04J 11/00* (2006.01)
*H04L 5/00* (2006.01)
*H04L 1/00* (2006.01)
*H04B 7/02* (2006.01)

(56) References Cited

U.S. PATENT DOCUMENTS

2013/0010714 A1* 1/2013 Kim .................. H04L 1/0038 370/329
2013/0100833 A1* 4/2013 Xu .................... H04W 52/42 370/252
2013/0183987 A1* 7/2013 Vrzic ................. H04L 1/0046 455/450

FOREIGN PATENT DOCUMENTS

KR 10-2011-0048226 A 5/2011
KR 10-2011-0084976 A 7/2011
WO WO 2011/032035 A2 3/2011

OTHER PUBLICATIONS

NTT DOCOMO: "Investigation of Cell Aggregation for Rel. 11 CoMP", 3GPP TSG RAN WG1 Meeting #67, R1-114077, Nov. 14-18, 2011.

Panasonic: "DCI format and blind decoding for LTE-Advanced", 3GPP TSG-RAN WG1 Meeting #59bis, R1-100362, Jan. 18-22, 2010.

LG Electronics: "Blind Decoding Reduction Methods", 3GPP TSG RAN WG1 Meeting #61, R1-102709, May 10-14, 2010.

LG Electronics: "Considerations on PDCCH Blind Decoding in Carrier Aggregation", 3GPP TSG RAN Wg 1 Meeting #62, R1-104753, Aug. 23-27, 2010.

* cited by examiner

FIG. 9
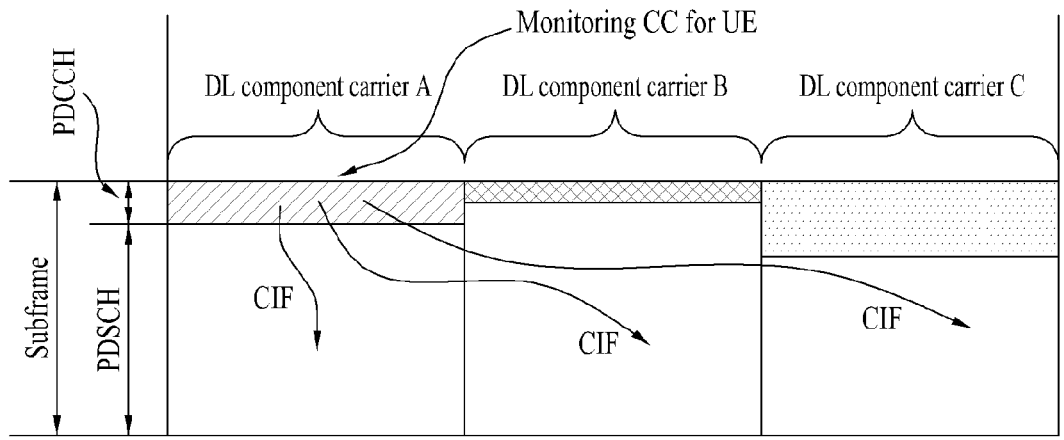
FIG. 10
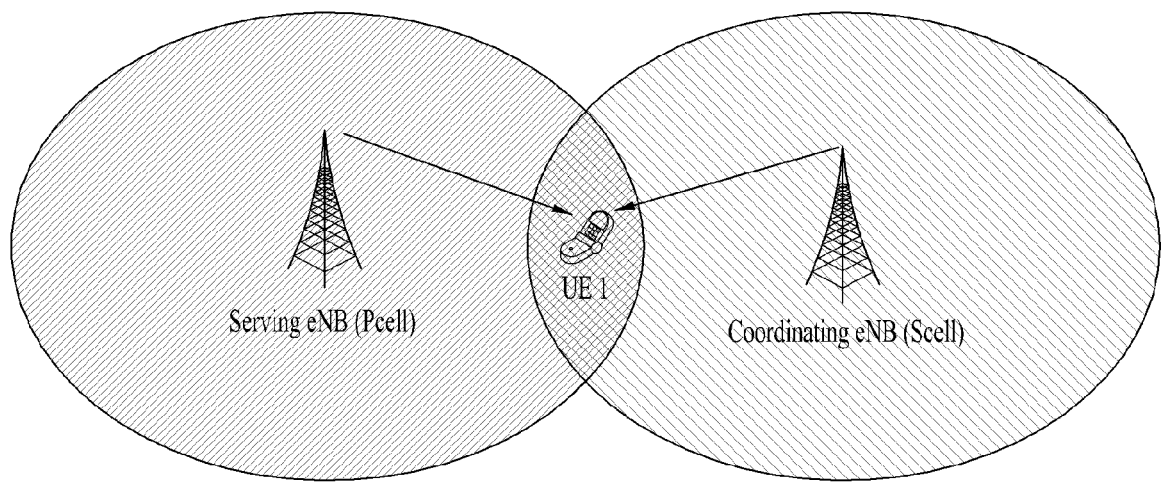
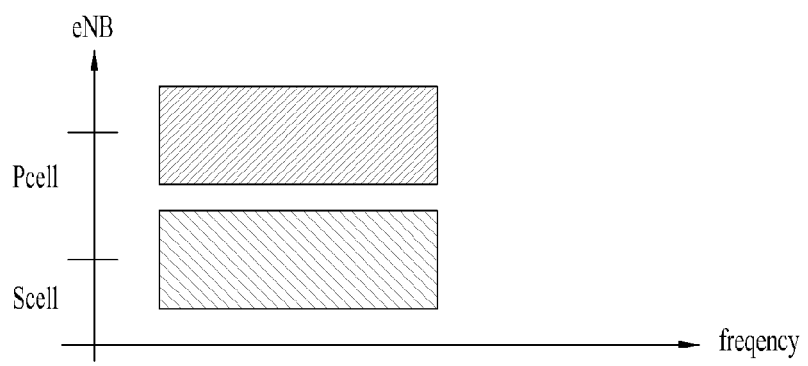

FIG. 11

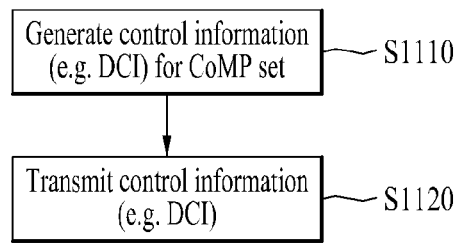

* DCI format for each cell of CoMP set is determined to have the same size according to the following method:
1) Method 1: a maximum size of DCI formats for CoMP cells
2) Method 2: a size of DCI format for CoMP PCell
3) Method 3: higher layer signaling

FIG. 12

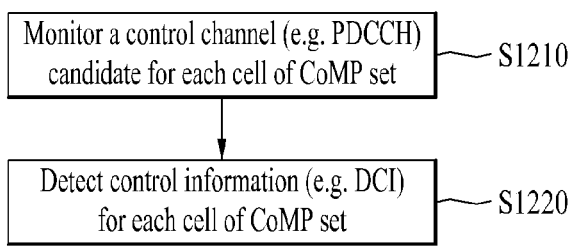

* It is assumed that control channel candidates have the same size according to the following method when monitoring the control channel candidate for each cell of CoMP set:
1) Method 1: a maximum size of DCI formats for CoMP cells
2) Method 2: a size of DCI format for CoMP PCell
3) Method 3: higher layer signaling

* Information size of the control channel candidate for each cell of CoMP set is determined as the same size based on control information size signaled through higher layer signaling.

METHOD OF SENDING/RECEIVING CONTROL INFORMATION AND DEVICE THEREFOR

This Application is a 35 U.S.C. §371 National Stage entry of International Application No. PCT/KR2013/000457, filed Jan. 21, 2013, which claims benefit of Provisional Application No. 61/588,644 filed Jan. 20, 2012, both of which are incorporated by reference in their entirety herein.

TECHNICAL FIELD

The present invention relates to a wireless communication system and, more particularly, to a method for transmitting and receiving control information and a device therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting and receiving control information in a wireless communication system and a device therefor. Another object of the present invention is to provide a method for efficiently transmitting and receiving downlink data in a wireless communication system.

The technical problems solved by the present invention are not limited to the above technical problems and those skilled in the art may understand other technical problems from the following description.

Technical Solution

In an aspect of the present invention, provided herein is a method for receiving control information about a coordinated multi-point (CoMP) set including a first cell and a second cell from a serving transmission point in a carrier aggregation (CA) based wireless communication system, the method including: receiving information about a control information size through higher layer signaling; and monitoring a plurality of control channel candidates for each cell of the CoMP set on the first cell of the CoMP set and detecting the control information, wherein information sizes of the control information candidates for each cell are determined to have a same size based on the information about the control information size.

Preferably, the control information may be generated by padding bits when an actual size of the control information is smaller than the control information size.

Preferably, the method may further include receiving data through the second cell on the basis of the control information, wherein the data is transmitted using a part of an entire bandwidth of the second cell when an actual size of the control information is greater than the control information size.

Preferably, the control information may comprise transmission mode common control information and transmission mode dedicated control information, wherein a size of the transmission mode common control information corresponds to a size of transmission mode common control information for the first cell and a size of the transmission mode dedicated control information is signaled through the higher layer signaling.

Preferably, the control information may be downlink control information (DCI) and the control channel candidates may be physical downlink control channel (PDCCH) candidates.

Preferably, the higher layer signaling corresponds to radio resource control (RRC) signaling.

In another aspect of the present invention, provided herein is a user equipment (UE) configured to receive control information about a coordinated multi-point (CoMP) set including a first cell and a second cell from a serving transmission point in a carrier aggregation (CA) based wireless communication system, the UE including: a processor; and a radio frequency (RF) module, wherein the processor is configured to receive information about a control information size through higher layer signaling, to monitor a plurality of control channel candidates for each cell of the CoMP set on the first cell of the CoMP set and to detect the control information, wherein information sizes of the control information candidates for each cell are determined to have a same size based on the information about the control information size.

Preferably, the control information may be generated by padding bits when an actual size of the control information is smaller than the control information size.

Preferably, the processor may be further configured to receive data through the second cell on the basis of the control information, wherein the data is transmitted using a part of an entire bandwidth of the second cell when an actual size of the control information is greater than the control information size.

Preferably, the control information may comprise transmission mode common control information and transmission mode dedicated control information, wherein a size of the transmission mode common control information corresponds to a size of transmission mode common control information for the first cell and a size of the transmission mode dedicated control information is signaled through the higher layer signaling.

Preferably, the control information may correspond to DCI and the control channel candidates may be PDCCH candidates.

Preferably, the higher layer signaling may correspond to RRC signaling.

According to embodiments of the present invention, it is possible to efficiently transmit and receive control information in a wireless communication system. Specifically, it is possible to efficiently transmit and receive downlink control information in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 9 illustrates scheduling when a plurality of carriers is aggregated;

FIG. 10 illustrates a CA based CoMP system;

FIG. 11 illustrates a method for transmitting control information in a transmission point according to an embodiment of the present invention;

FIGS. 12 and 13 illustrate methods for receiving control information in a UE according to an embodiment of the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE. While the following description is given, centering on 3GPP LTE/LTE-A to clarify the description, this is purely exemplary and thus should not be construed as limiting the present invention.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
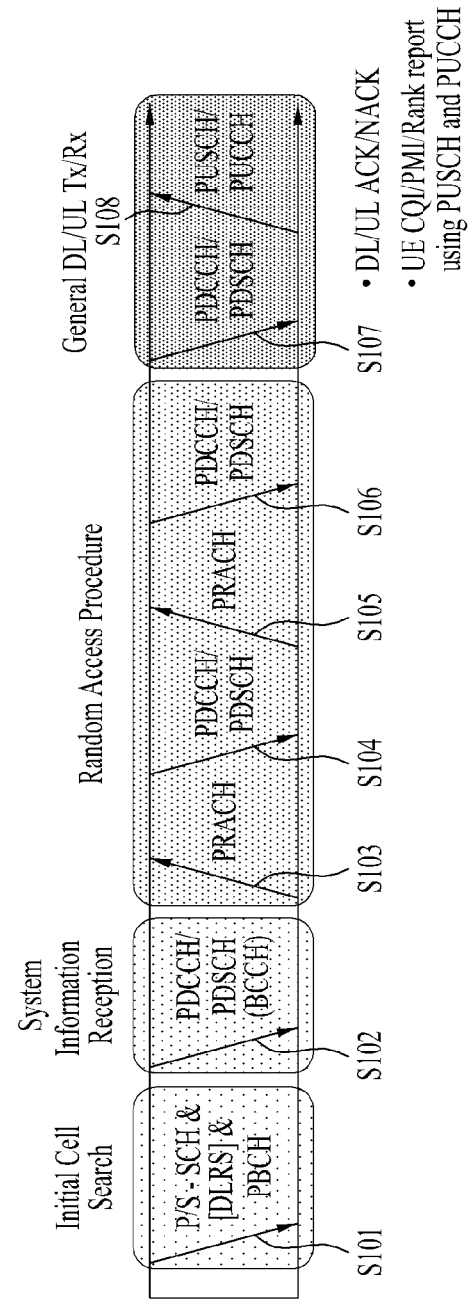
FIG. 1 illustrates physical channels used in a 3GPP LTE system and a conventional signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement(ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
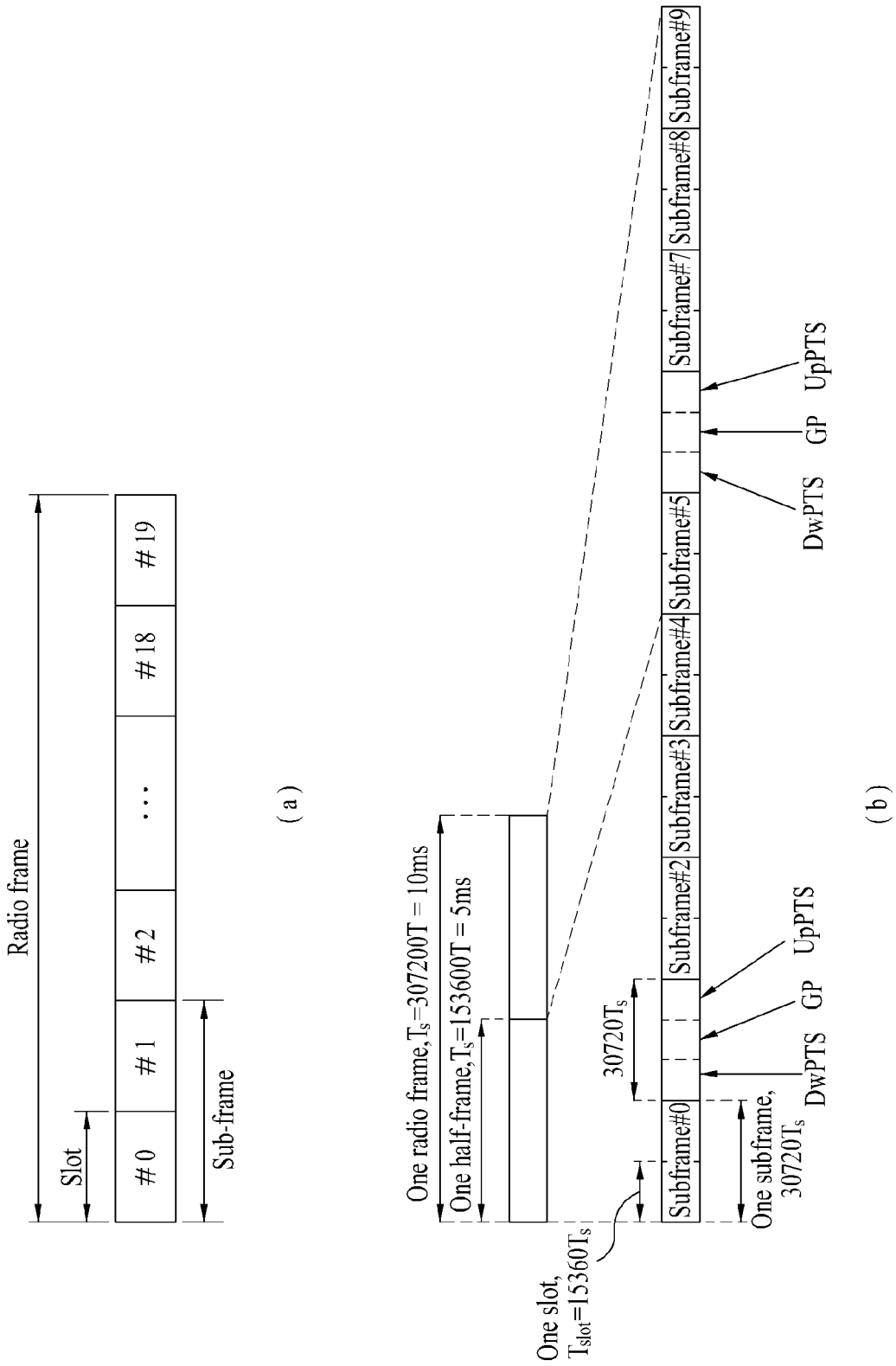
FIG. 2 illustrates a radio frame structure.

FIG. 2 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. LTE(-A) supports a type-1 radio frame structure for FDD (frequency division duplex) and a type-2 radio frame structure for TDD (time division duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes. A subframe may be one of a downlink subframe, an uplink subframe and a special subframe. The special subframe can be used as a downlink subframe or an uplink subframe according to TDD configuration. The special subframe includes a downlink pilot time slot (DwPTS), a guard period (GP), and an uplink pilot time slot (UpPTS). The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. Table 1 shows UL-DL configurations of subframes in a radio frame in the TDD mode.

Figure 3:
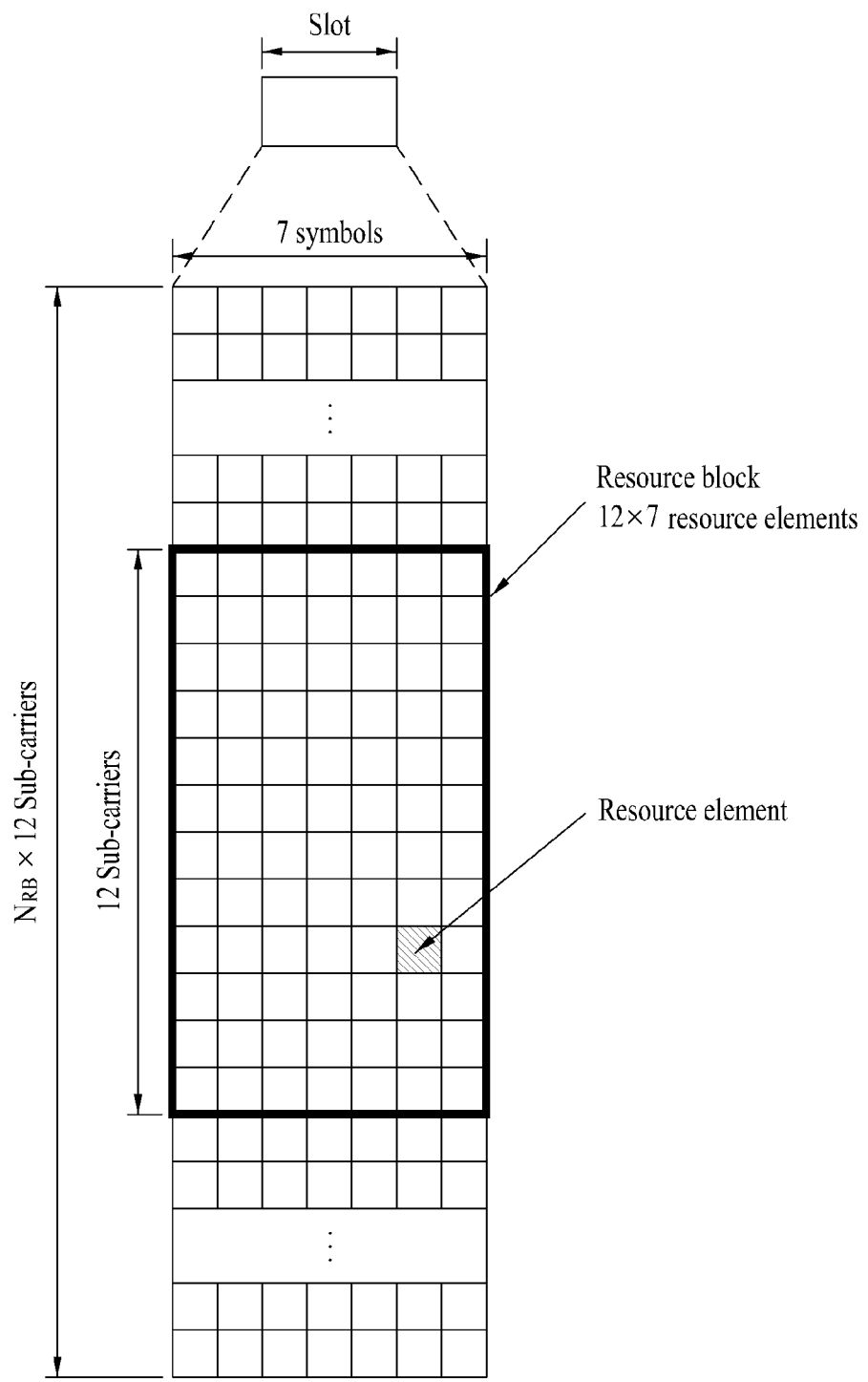
FIG. 3 illustrates a resource grid of a downlink slot.

The radio frame structure is exemplary and the number of subframes, the number of slots and the number of symbols in a radio frame can vary FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain in FIG. 3. However, the present invention is not limited thereto. Each element on the resource grid is referred to as a resource element (RE). One RB includes 12×7 REs. The number $N_{DL}$ of RBs included in the downlink slot depends on a downlink transmit bandwidth. The structure of an uplink slot may be same as that of the downlink slot.

Figure 4:
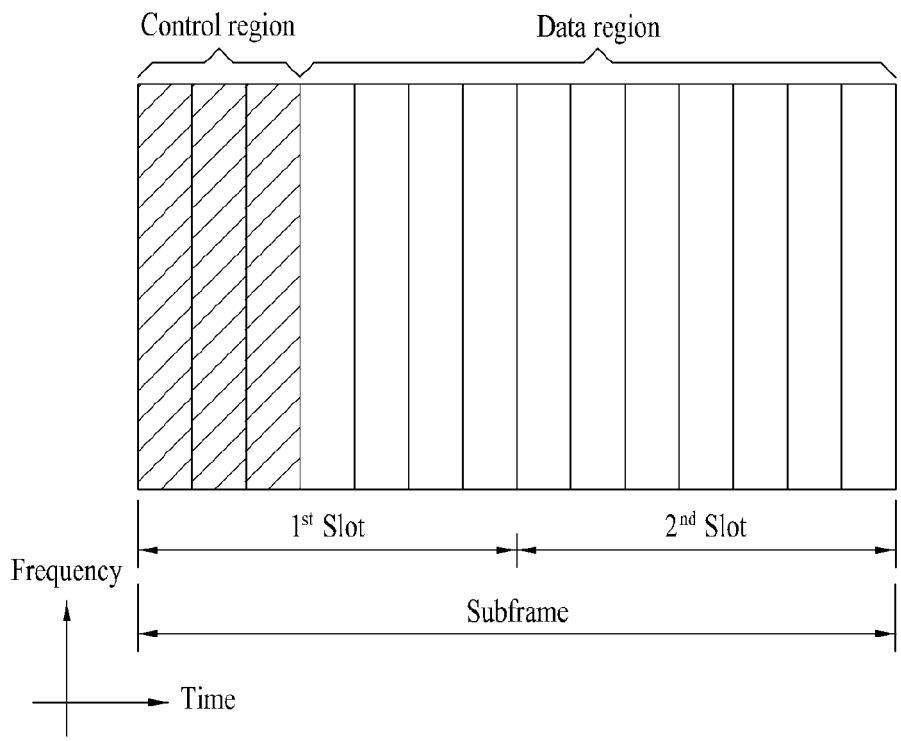
FIG. 4 illustrates a downlink subframe structure.

FIG. 4 illustrates a downlink subframe structure.

Referring to FIG. 4, a subframe includes a plurality of (e.g. 2) time regions multiplexed according to TDD (Time Division Multiplexing). The time region can be used to transmit a control signal. The second time region can be used to transmit a data signal. The first time region may be referred to as a control region and the second time region may be referred to as a data region for convenience. Specifically, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS, GP and UpPTS. Table 2 shows special subframe configurations.

a physical control format indicator channel (PCFICH), a physical downlink control channel (PDCCH), a physical hybrid ARQ indicator channel (PHICH), etc. The PCFICH is transmitted at a first OFDM symbol of a subframe and

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — | carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or uplink transmit power control commands for an arbitrary UE group.

Formats 0, 3, 3A and 4 for uplink and formats 1, 1A, 1B, 1C, 1D, 2, 2A, 2B and 2C for downlink are defined as DCI formats. Information field type, the number of information fields and the number of bits of each information bit depend on DCI format. For example, the DCI formats selectively include information such as hopping flag, RB allocation, MCS (Modulation Coding Scheme), RV (Redundancy Version), NDI (New Data Indicator), TPC (Transmit Power Control), HARQ process number, PMI (Precoding Matrix Indicator) confirmation according as necessary. Accordingly, the size of control information mapped to a DCI format depends on the DCI format. An arbitrary DCI format may be used to transmit two or more types of control information. For example, DCI formats 0/1A are used to carry DCI format 0 or DCI format 1 and are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A PDCCH carries a message known as DCI and the DCI includes information about resource assignment for one UE or UE group and control information. In general, a plurality of PDCCHs can be transmitted in a single subframe. Each PDCCH is transmitted using one or more control channel elements (CCEs) and each CCE corresponds to 9 sets of resource element groups (REGs). An REG corresponds to 4 REs. 4 QPSK symbols are mapped to one REG. REs allocated to a reference signal are not included in an REG, and thus the number of REGs within a given OFDM symbol varies according to whether a cell-specific reference signal is present. The concept of REG (i.e. group based mapping, each group including 4 REs) is used for other downlink control channels (PCFICH and PHICH). That is, an REG is used as a basic resource unit of a control region. 4 PDCCH formats are supported as shown in Table 3.

TABLE 3

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as 'search space (SS)'. In LTE, an SS has a size depending on PDCCH format. A UE-specific search space (USS) and a common search space (CSS) are defined. The USS is set per UE and the CSS is equally set for UEs. The USS and the CSS may overlap for a predetermined UE. In the case of considerably small SS, when some CCE positions are allocated in an SS for a specific UE, there is no remaining CCE. Accordingly, a BS may not find CCE resources to be used to transmit PDCCHs to all available UEs in a predetermined subframe. To minimize the possibility that the above-described blocking continues in the next frame, a UE-specific hopping sequence is applied to the starting point of the USS.

Table 4 shows sizes of the USS and CSS.

TABLE 4

| PDCCH format | Number of CCEs (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. Transmission modes for MIMO and information content of DCI formats are arranged below.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using a UE-specific reference signal DCI Format
Format 0: Resource grants for PUSCH transmission (uplink)
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH (mode 6) using rank-1 closed loop precoding
Format 1C: Very compact resource assignments for PDSCH (e.g. paging/broadcast system information)
Format 1D: Compact resource assignments for PDSCH (mode 5) using multi-user MIMO
Format 2: Resource assignments for PDSCH (mode 4) for closed-loop MIMO operation
Format 2A: Resource assignments for PDSCH (mode 3) for open-loop MIMO operation
Format 3/3A: Power control commands for PUCCH and PUSCH with 2-bit/1-bit power adjustment values Considering the above description, the UE needs to perform a maximum of 44 BD processes in a single subframe. Since checking the same message with different CRC values requires only low additional computational complexity, the process of checking the same message with different CRC values is not counted for the number of BD processes.

Figure 5:
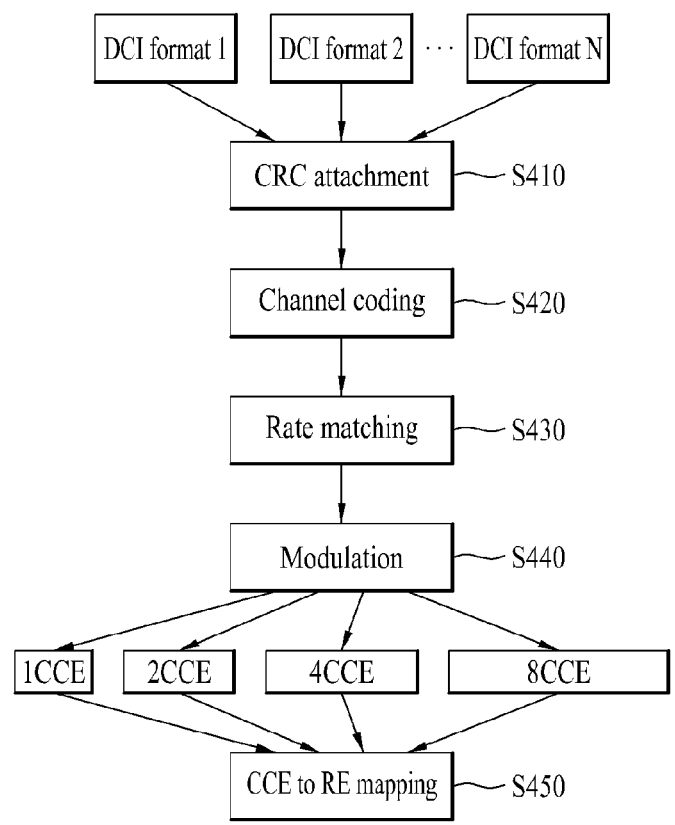
FIG. 5 illustrates a procedure through which an eNB configures a PDCCH.

FIG. 5 is a flowchart illustrating a process of configuring a PDCCH in a BS.

Referring to FIG. 5, the BS generates control information according to DCI format. The BS may select one of a plurality of DCI formats (DCI formats 1, 2, ..., N) according to control information to be sent to a UE. A CRC for error detection is attached to the control information generated according to DCI format in step S410. The CRC is masked with an identifier (e.g. radio network temporary identifier (RNTI)) according to the owner or purpose of the PDCCH. In other words, the PDCCH is CRC-scrambled with the identifier (e.g. RNTI).

Table 5 shows examples of the identifier masking the PDCCH.

TABLE 5

| Type | Identifier | Description |
|---|---|---|
| UE-specific | C-RNTI, Temporary C-RNTI, Semi-persistent C-RNTI | used for a unique UE identification |
| Common | P-RNTI | used for paging message |
| | SI-RNTI | used for system information |
| | RA-RNTI | used for random access response |

The PDCCH carries control information for a specific UE when C-RNTI, temporary C-RNTI (TC-RNTI) or semi-persistent scheduling C-RNTI (SPS C-RNTI) is used and carries common control information received by all UEs in a cell when other RNTIs are used. Channel coding is performed on the control information to which the CRC is attached to generate coded codewords in step S420. The coded codewords may be rate-matched according to allocated CCE aggregation level in step S430. The coded codewords are modulated to generate modulation symbols in step S440. Modulation symbols corresponding to one PDCCH may have a CCE aggregation level of 1, 2, 4 or 8. The modulation symbols are mapped to REs (CCE to RE mapping) in step S450.

Figure 6:
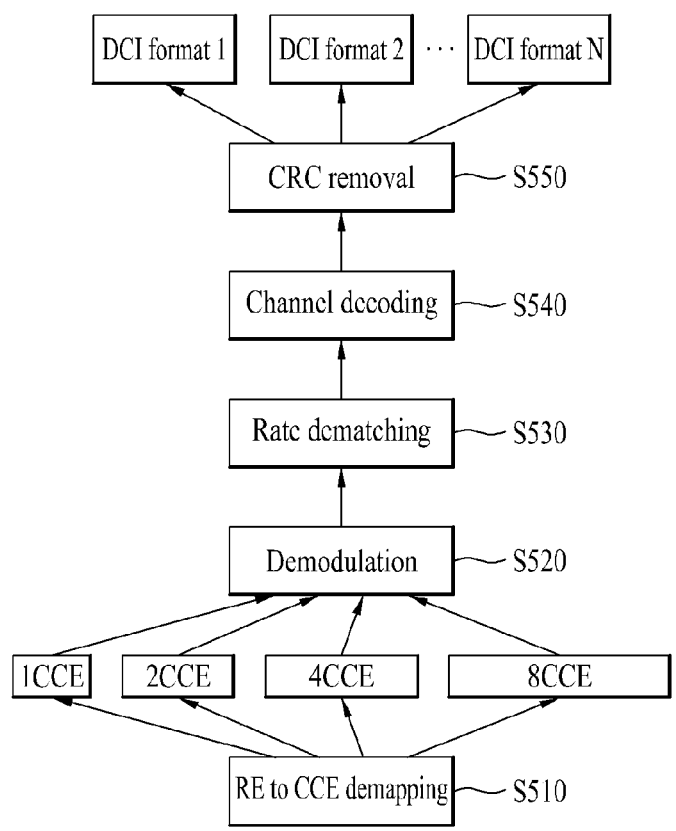
FIG. 6 illustrates a procedure through which a UE processes a PDCCH.

FIG. 6 is a flowchart illustrating a process of processing a PDCCH by a UE.

Referring to FIG. 6, the UE demaps physical REs to CCEs (CCE to RE demapping) in step S510 Since the UE does not know the CCE aggregation level at which the PDCCH will be received, the UE demodulates control information per CCE aggregation level in S520. The UE may rate-dematch the demodulated control information in S530. In this case, the UE may rate-demathing the demodulated control information per DCI format (or DCI payload size) since the UE does not know the DCI format (or DCI payload size) of control information that the UE needs to receive. The UE performs channel decoding on the descrambled control information according to code rate and checks the CRC to detect an error in step S540. When an error is not detected, the UE detects the PDCCH thereof. When an error is detected, the UE continuously performs blind decoding for other CCE aggregation levels or other DCI formats (or DCI payload sizes). Upon detection of the PDCCH thereof, the UE detaches the CRC from the decoded control information to obtain the control information in step S550.

A plurality of PDCCHs for a plurality of UEs can be transmitted in a control region of the same subframe. The BS does not provide information about the positions of the PDCCHs in the control region to the UEs. Accordingly, a UE detects the PDCCH thereof by monitoring a set of PDCCH candidates in the subframe. Here, monitoring refers to operation of a UE to attempt to decode received PDCCH candidates according to DCI format. This is referred to as blind decoding or blind detection. The UE simultaneously identifies the PDCCH transmitted thereto and decodes control information transmitted on the PDCCH through blind decoding. For example, the UE demasks the PDCCH with a C-RNTI and, when a CRC error is not detected, it is considered that the UE has successfully detected the PDCCH.

To reduce blind decoding overhead, the number of DCI formats is smaller than the number of types of control information using the PDCCH. A DCI format includes a plurality of information fields. Information field type, the number of information fields and the number of bits of each information field depend on DCI format. In addition, the size of control information mapped to a DCI format depends on the DCI format. An arbitrary DCI format can be used to transmit two or more types of control information.

Table 6 shows examples of control information transmitted through DCI format 0. In Table 6, information field bit sizes are exemplary and the present invention is not limited thereto.

TABLE 6

| Information field | Bit(s) |
|---|---|
| (1) Flag for format 0/format 1A differentiation | 1 |
| (2) Hopping flag | 1 |
| (3) Resource block assignment and hopping resource allocation | $\lceil \log_2(N_{RB}^{UL}(N_{RB}^{UL}+1)/2) \rceil$ |
| (4) Modulation and coding scheme and redundancy version | 5 |
| (5) New data indicator | 1 |
| (6) TPC command for scheduled PUSCH | 2 |
| (7) Cyclic shift for DM RS | 3 |
| (8) UL index (only for TDD) | 2 |
| (9) CQI request | 1 |

The flag field is an information flag for discriminating between format 0 and format 1A. That is, DCI format 0 and DCI format 1A have the same payload size and are discriminated from each other by flag fields. The bit size of the resource block allocation and hopping resource allocation field may vary according to hopping PUSCH or non-hopping PUSCH. The resource block allocation and hopping resource allocation field for the non-hopping PUSCH provides $\lceil \log_2(N_{RB}^{UL}(N_{RB}^{UL}+1)/2) \rceil$ bits for resource allocation of the first slot in an uplink subframe. Here, $N_{RB}^{UL}$ denotes the number of RBs included in an uplink slot and depends upon an uplink transmission bandwidth set in a cell. Accordingly, the payload size of DCI format 0 can depend upon uplink bandwidth. DCI format 1A includes an information field for PDSCH allocation. The payload size of DCI format 1A can depend upon downlink bandwidth. DCI format 1A provides a reference information bit size for DCI format 0. Accordingly, DCI format 0 is padded with '0' until the payload size of DCI format 0 becomes identical to the payload size of DCI format 1A when the number of information bits of DCI format 0 is less than the number of information bits of DCI format 1A. The added '0' is filled in a padding field of DCI format.

Figure 7:
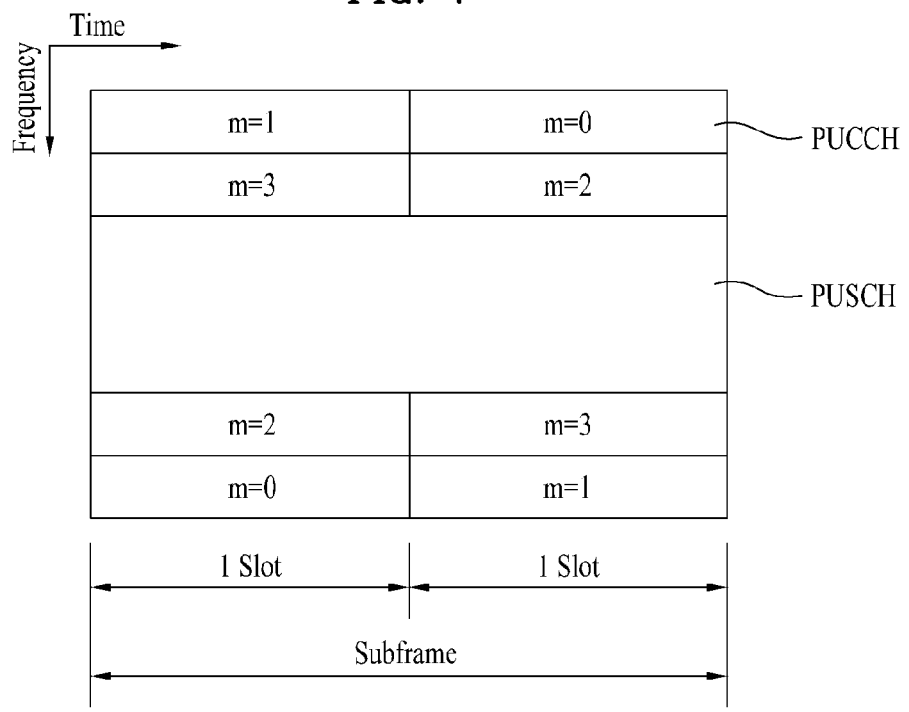
FIG. 7 illustrates an uplink subframe structure.

FIG. 7 illustrates an uplink subframe structure used in LTE.

Referring to FIG. 7, an uplink subframe includes a plurality of (e.g. 2) slots. A slot may include different numbers of SC-FDMA symbols according to CP length. For example, a slot can include 7 SC-FMDA symbols in the case of normal CP. The uplink subframe is divided into a control region and a data region in the frequency domain. The data region is allocated a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. The control information includes HARQ ACK/NACK, CQI (channel quality information), PMI (precoding matrix indicator), RI (rank indicator), etc.

Figure 8:
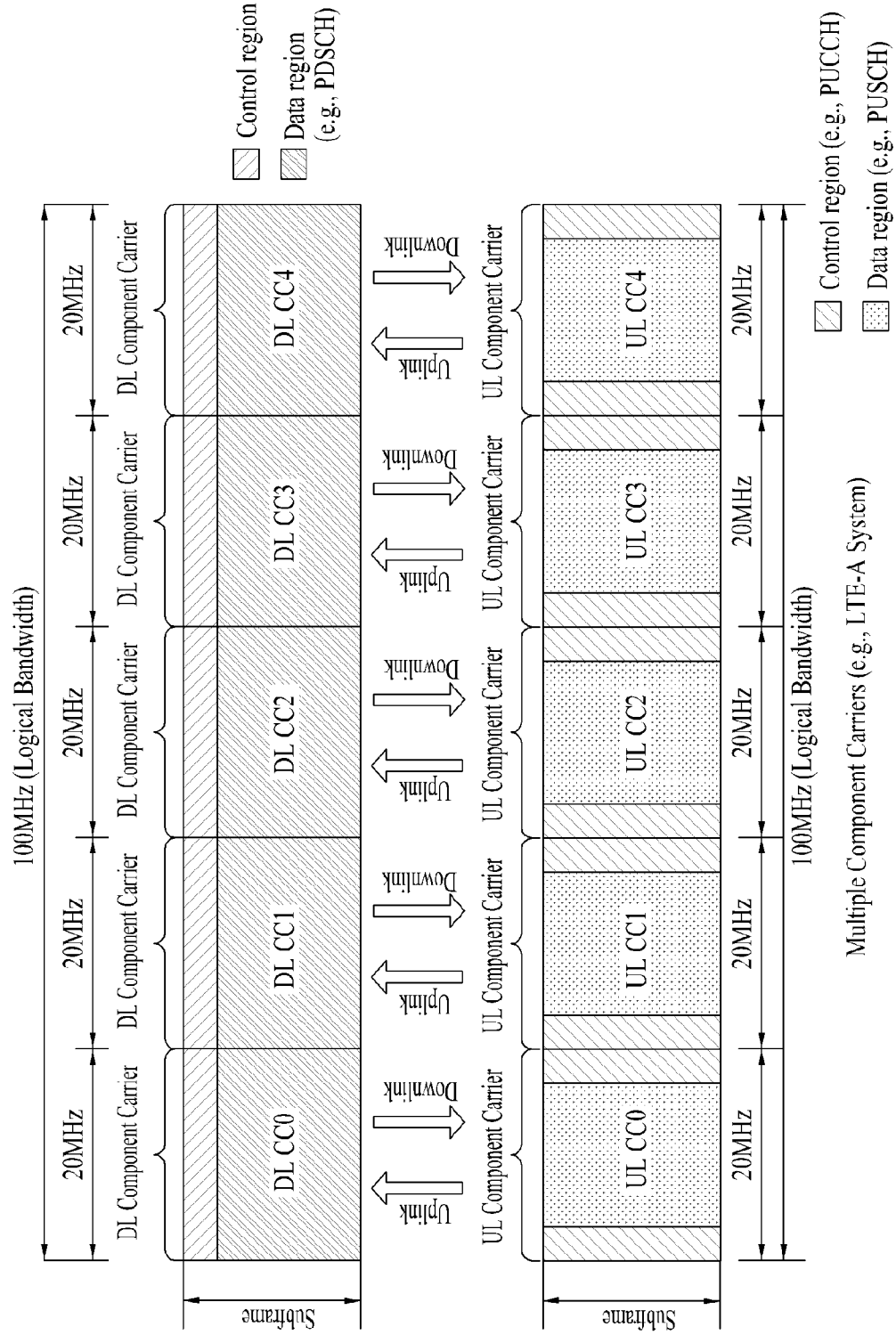
FIG. 8 illustrates a carrier aggregation (CA) communication system.

FIG. 8 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block. The term component carrier may be replaced by other equivalent terms (e.g. carrier, cell, etc.).

Referring to FIG. 8, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When plural CCs are aggregated, a specific CC may carry information about the other CCs, which is referred to as cross-carrier scheduling (or cross-CC scheduling). When cross-carrier scheduling is applied, a PDCCH for downlink allocation can be transmitted on DL CC #0 and a PDSCH corresponding thereto can be transmitted on DL CC #2.

For cross-CC scheduling, a carrier indicator field (CIF) can be used. Presence or absence of the CIF in a PDCCH can be determined by higher layer signaling (e.g. RRC signaling) semi-statically and UE-specifically (or UE group-specifically). The baseline of PDCCH transmission is summarized as follows.

■ CIF disabled: a PDCCH on a DL CC is used to allocate a PDSCH resource on the same DL CC or a PUSCH resource on a linked UL CC.
  ● No CIF
■ CIF enabled: a PDCCH on a DL CC can be used to allocate a PDSCH or PUSCH resource on a specific DL/UL CC from among a plurality of aggregated DL/UL CCs using the CIF.
  ● LTE DCI format extended to have the CIF
    CIF corresponds to a fixed x-bit field (e.g. x=3) (when the CIF is set).
    CIF position is fixed irrespective of DCI format size (when the CIF is set).

When the CIF is present, the BS can allocate a PDCCH monitoring DL CC (set) to reduce BD complexity of the UE. For PDCCH/PUSCH scheduling, the UE can detect/decode a PDCCH only in the corresponding DL CC. The BS can transmit the PDCCH only through the monitoring DL CC (set). The monitoring DL CC set can be set UE-specifically, UE-group-specifically or cell-specifically.

FIG. 9 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used to transmit a PDCCH is referred to as a scheduling CC (or cell) or monitoring CC (or cell). A CC (or cell) having a PDSCH/PUSCH scheduled by a PDCCH of another CC is referred to as a scheduled CC (or cell). One or more scheduling CCs can be configured for one UE and one of the scheduling CCs can be configured for DL control signaling and UL PUCCH transmission. That is, a scheduling CC includes a PCC and, when only one scheduling CC is present, the scheduling CC can be equivalent to the PCC.

When cross-CC scheduling is set, CCs on which signals are transmitted are defined according to signal type as follows.

PDCCH (UL/DL grant): scheduling CC
PDSCH/PUSCH: CC indicated by a CIF of a PDCCH detected from a scheduling CC
DL ACK/NACK (e.g. PHICH): scheduling CC (e.g. DL PCC)
UL ACK/NACK (e.g. PUCCH): UL PCC FIG. 10 illustrates a CA based CoMP system. A coordinated multi-point (CoMP) system will now be described first.

CoMP (which may be referred to as co-MIMO, collaborative MIMO or network MIMO) is proposed by demands for improved system performance of 3GPP LTE-A. CoMP can improve the performance and average sector throughput of a UE located at a cell edge.

In a multi-cell environment in which a frequency reuse factor is 1, the performance and average sector throughput of a UE located at a cell edge may decrease due to inter-cell interference (ICI). To reduce ICI, a method of allowing a UE located at a cell edge to have appropriate throughput performance in an environment where interference is applied to the UE using a simple passive technique such as fractional frequency reuse (FFR) through UE-specific power control is applied in LTE. However, it may be desirable to reduce ICI or to reuse ICI as a signal that the UE desires rather than decreasing frequency resource use per cell. To achieve this, CoMP can be applied.

CoMP applicable to downlink may include joint transmission (JT), coordinated scheduling/beamforming (CS/CB) and dynamic cell selection (DCS).

JT refers to a scheme through which downlink signals (e.g. PDSCH, PDCCH, etc.) are simultaneously transmitted from a plurality of points (some or all points (e.g. eNB) participating in CoMP operation). That is, data may be simultaneously transmitted to a single UE from a plurality of transmission points. Through joint transmission, quality of a received signal may be improved coherently or non-coherently and interference on other UEs may be actively eliminated.

Dynamic cell selection refers to a scheme by which a PDSCH is transmitted from one point (from among points participating in CoMP operation). That is, data is transmitted to a single UE from a single point at a specific time, other points participating in CoMP operation do not transmit data to the UE at the time, and the point that transmits the data to the UE may be dynamically selected.

According to the CS/CB scheme, points participating in CoMP operation may collaboratively perform beamforming of data transmission to a single UE. Here, user scheduling/beaming may be determined according to coordination of points participating in the corresponding CoMP operation although data is transmitted only from a serving cell.

In the case of uplink, coordinated multi-point reception refers to cooperative reception of a signal by a plurality of points geographically spaced apart from one another. CoMP schemes applicable to uplink may be classified into joint reception (JR) and coordinated scheduling/beamforming (CS/CB).

JR is a scheme by which a plurality of reception points receives a signal transmitted over a PUSCH and CS/CB is a scheme by which only a single point receives a PUSCH and scheduling/beamforming is performed.

A UE can commonly receive data from multi-cell base stations using the CoMP system. In addition, base stations can simultaneously support one or more UEs using the same radio frequency resource to improve system performance. Furthermore, a base station may perform space division multiple access (SDMA) based on information on channel state between the base station and a UE.

A serving eNB and one or more coordinating eNBs can be connected to a scheduler through a backbone network in a CoMP system. The scheduler can operate on the basis of channel information about a channel state between each UE and each coordinating eNB, measured by each eNB, fed back thereto through the backbone network. For example, the scheduler can schedule information for coordinating MIMO operation for the serving eNB and one or more coordinating eNBs. That is, the scheduler can directly instruct each eNB to perform coordinated MIMO operation.

As described above, the CoMP system can be considered as a virtual MIMO system using a plurality of transmission points grouped into one group and MIMO using multiple antennas can be applied thereto.

In systems subsequent to LTE, CoMP transmission can be implemented using carrier aggregation (CA). FIG. 10 illustrates CA based CoMP operation. Referring to FIG. 10, a primary cell PCell and a secondary cell SCell use different frequency bands or the same frequency band in the frequency domain and are allocated to two transmission points (e.g. eNBs) spaced apart from each other. Various DL/UL CoMP operations such as CS/CB, DCS, etc. can be achieved by allocating the PCell of UE1 to a serving transmission point and allocating the SCell to a neighboring transmission point causing severe interference.

While FIG. 10 shows that UE1 aggregates the two eNBs as PCell and SCell, a UE may aggregate three or more cells, some secondary cells from among the aggregated cells may perform CoMP operation in the same frequency band and other cells may perform simple CA operation in different frequency bands. In this case, PCell may not participate in the CoMP operation.

The present invention is applicable to the aforementioned CA based CoMP operation. The following terms are defined for convenience of description prior to description of the present invention.

CA set: a set of cells aggregated by a UE

CA cell: a cell belonging to a CA set

PCell: One of cells belonging to a CA set can be designated as a PCell. For example, a cell used for initial RRC connection with an eNB from among cells aggregated by a UE can be designated as a PCell. The UE can receive a physical channel for obtaining DL system information, such as a PBCH, PDCCH (in CSS), etc. through DL of the PCell and transmit a PUCCH carrying ACK/NACK, CSI feedback, etc. through UL of the PCell.

SCell: A cell which is not a PCell from among cells aggregated by a UE is referred to as an SCell.

CoMP set: Cells to which CoMP operation is applied from among cells aggregated by a UE are referred to as a CoMP set. Here, cells to which CoMP operation is applied can correspond to only cells which participate in signaling, transmission and reception for CoMP operations such as JT, DCS, CB, CS, etc. or include all candidate cells.

CoMP cell: a cell belonging to a CoMP set. Time/frequency synchronization and parameters such as the number of DL antennas/RS configuraton can be independently set per CoMP cell. Accordingly, each CoMP cell can correspond to a specific set of the parameters.

CoMP PCell: one of cells belonging to a P-CoMP set. For example, the CoMP PCell can correspond to a PCell or can be configured through higher layer signaling (e.g. RRC signaling) separately from the PCell. Alternatively, the CoMP PCell can be a cell which transmits a PDCCH for scheduling PDSCH/PUSCH transmission for CoMP cells belonging to a CoMP set. A specific field in the PDCCH transmitted through the CoMP PCell can be used to transmit information that indicates a CoMP cell for which PDSCH/PUSCH transmission is scheduled. The information indicating the CoMP cell may include information that indicates carrier identification information (e.g. CIF) or a specific parameter set (e.g. RS configuration, PDSCH staring position and/or QCL (Quasi-Co-L0caton) parameter, etc.) corresponding to the CoMP cell. For example, when CoMP cells belonging to the CoMP set are different carriers, the information indicating the CoMP cell can include carrier identification information. In addition, when the CoMP cells belonging to the CoMP set correspond to the same carrier, the information indicating the CoMP cell can include information that indicates the specific parameter set to the CoMP cell.

CoMP SCell: a cell which is not a CoMP PCell from among cells belonging to a CoMP set.

In the present invention, a CoMP set for a UE may correspond to a CA set or may be included in the CA set. In addition, while the present invention assumes a case in which CoMP cells use overlapping frequency bands/carriers from the viewpoint of a UE, the present invention can be extended to other cases. Furthermore, while the present invention assumes that only one CoMP set is configured for one UE, the present invention can be applied to each CoMP set when a plurality of CoMP sets is configured for one UE. Moreover, techniques applied to CoMP transmission in the present invention can be limitedly applied to a specific interval (e.g. subframe).

In the present invention, a CoMP set may be a cell group (explicitly, "CoMP set") in which CoMP operation is performed. However, the CoMP set to which the present invention is applied may be a cell group which is grouped through higher layer signaling (e.g. RRC signaling) even if CoMP operation is not explicitly performed. Cells aggregated by a UE may constitute a cell group or some of the cells may belong to the cell group and some of the cells may not belong to the cell group.

The present invention proposes a control channel signaling method for CoMP operation with respect to a UE by configuring a plurality of cells which participate in the CoMP operation as the cells are aggregated for the UE Control Signaling for PDSCH Scheduling In LTE Rel-8/9 corresponding to a single-carrier system, a maximum of one PDSCH can be scheduled/transmitted through a single subframe and up to M blind decoding (BD) operations can be attempted to decode a DL grant PDCCH that schedules the PDSCH. When only a UE-specific search space (USS) except for a common search space is considered, the value of M can depend on the number (e.g. 1 or 2) of DL grant DCI formats, set per transmission mode (TM), and can reach 32. In CA based Rel-10 LTE-A, a maximum of one PDSCH can be scheduled/transmitted per CC through a single subframe. Here, when the number of aggregated CCs is defined as Nc, up to NcxM blind decoding operations can be attempted for DL grant PDCCH detection.

In addition, to support CoMP operation using CA, it is possible to consider a method of allocating a CoMP set (aggregating CoMP cells) to a UE, setting cross-CC scheduling based on a specific field (e.g. CIF) and then indicating a CoMP cell through which a PDSCH scheduled by a PDCCH transmitted through a CoMP PCell (or a PDCCH that schedules a cell set to a CoMP transmission mode) using a specific field (e.g. CIF) included in the PDCCH (in the case of DCS). Otherwise, it is possible to consider a method of indicating an RS configuration, PDSCH starting position and/or QCL parameter upon which transmission of a PDSCH scheduled by a PDCCH transmitted in a CoMP PCell (or a PDCCH that schedules a cell configured in a CoMP transmission mode) is based using a field indicating a parameter set for CoMP transmission, which is included in the PDCCH. Alternatively, it is possible to consider a method for indicating a CoMP transmission scheme (e.g. JT, CB or CS) used to transmit the corresponding PDSCH. In these cases, the maximum number of PDSCHs that can be scheduled/transmitted through a single subframe from the corresponding CoMP set may be one. Here, the number of blind decoding operations allocated to the CoMP set can be limited to M instead of NcxM in terms of the number of PDSCHs rather than the number of cells even though a plurality of CoMP cells belongs to the CoMP set in order to reduce blind decoding complexity. A search space for which the blind decoding operations are performed may be a search space configured for scheduling a CoMP PCell.

In this situation, if CoMP cells belonging to the CoMP set have different transmission modes and/or different bandwidths since different channel states, different numbers of DL transmit antennas, different RS configurations (CRS (common reference signal or cell-specific reference signal) and DM RS (demodulation reference signal)) are set therefor, then the CoMP cells may have different DCI format payload sizes. In this case, the number of blind decoding operations may increase and a degree of freedom of PDCCH allocation for each call may decrease.

Accordingly, the present invention proposes a method of setting payload sizes of DCI formats set in all CoMP cells belonging to a CoMP set to the same value in order to support M blind decoding operations per CoMP set when CA based CoMP is applied. In this case, it may be necessary to set payload sizes of TM-common DCI formats (e.g. 1A) set in CoMP cells belonging to a CoMP set to the same value and to set payload sizes of TM-dedicated DCI formats (e.g. 1/1B/1D/2/2A/2B/2C) set in CoMP cells belonging to the CoMP set to the same value in order to maintain M blind decoding operations per CoMP set. Accordingly, a UE can perform blind decoding for one DCI format payload size for each of the TM-common DCI format and the TM-dedicated DCI format in detection of a PDCCH that schedules a CoMP set. The following three methods can be considered to determine DCI format payload sizes.

Method 1

The present method sets the payload size of a DCI format for scheduling a CoMP set, transmitted through a CoMP PCell, to a maximum size from among the sizes of DCI formats (i.e. DCI formats set in respective CoMP cells belonging to the CoMP set according to TMs, BWs, the numbers of DL antennas, RS configurations of the CoMP cells) set in all CoMP cells belonging to the corresponding CoMP set.

According to the present method, intentional bit padding may be applied to a DCI format set in a certain CoMP cell to adjust the payload size thereof to the maximum size. In addition, contents included in the DCI format corresponding to the maximum size can be interpreted according to a specific field value. Furthermore, the present method can be applied to the TM-common DCI format and TM-dedicated DCI format.

Alternatively, in the case of TM-common DCI format (e.g. 1A) (more specifically, a TM-common DCI format (e.g. 1A) set for a common search space (CSS) in the case of CoMP PCell), the size of the TM-common DCI format can be set to the size of a DCI format set in the CoMP PCell in consideration of backward compatibility with other existing DCI formats, prevention of increase in the number of blind decodings and RRC reconfiguration.

According to method 1, a UE can perform blind decoding based on the maximum DCI format size irrespective of set DCI formats. When the UE recovers a DCI format payload from a PDCCH decoded through blind decoding, if a set DCI format size is less than the maximum DCI format size, then the UE can abandon padded bits corresponding to a difference between the set DCI format size and the maximum DCI format size. Alternatively, when information predefined between the UE and a BS is inserted as padded bits, the UE can check an error using the padded bits (virtual CRC).

Method 2

This method sets the payload size of a DCI format for scheduling a CoMP set, transmitted through a CoMP PCell, to the size of a DCI format set in the CoMP PCell irrespective of sizes of DCI formats set in CoMP cells belonging to the CoMP set according to TM, BW, the number of DL antennas and RS configuration.

According to method 2, when a DCI format set in a CoMP SCell has a size less than a DCI format set in the CoMP PCell, bit padding is applicable. When the DCI format set in the CoMP SCell has a size greater than the DCI format set in the CoMP PCell, a resource assignment field can be reduced. For example, the resource assignment field can be reduced by limiting a PDSCH/PUSCH transmission region in the bandwidth of the CoMP SCell. When the PDSCH/PUSCH transmission region is limited, a procedure for mapping resources allocated to the PDSCH/PUSCH transmission region to the limited transmission region may be needed.

Method 2 can be applied to the TM-common DCI format and TM-dedicated DCI format. Method 2 is efficient in terms of utilization of PDCCH (CCE) resources and can be advantageous for RRC reconfiguration, considering that PDSCH scheduling is mostly performed through the CoMP PCell.

According to method 2, the UE can perform blind decoding based on the size of the DCI format set in the CoMP PCell irrespective of set DCI formats. When the UE recovers a DCI format payload from a PDCCH detected through blind decoding, if the DCI format size set in the CoMP PCell is greater than or equal to an actual DCI format size, then the UE can use only information corresponding to the actual DCI format size and abandon information corresponding to padded bits. Alternatively, when information predefined between the UE and the BS is inserted as padded bits, the UE can check an error using the padded bits (virtual CRC). If the DCI format size set in the CoMP PCell is less than the actual DCI format size, the UE can receive a PDSCH as allocated by the detected PDCCH although data is transmitted through a limited PDSCH transmission region in the bandwidth of the corresponding CoMP SCell.

Method 3

The present method sets the payload size of a DCI format for scheduling a CoMP set, transmitted through a CoMP PCell, or a resource assignment bandwidth size (e.g. the number/range of RBs for which resources are allocated) through higher layer signaling (e.g. RRC signaling).

According to the present method, bit padding can be applied to a CoMP cell having a DCI format payload or resource assignment bandwidth less than a size set through RRC signaling and resource assignment field reduction can be applied to a CoMP cell having a DCI format payload or resource assignment bandwidth greater than the set size. As described in method 2, resource assignment field reduction can be achieved by limiting a PDSCH/PUSCH transmission region in the bandwidth of the CoMP cell. When the PDSCH/PUSCH transmission region is limited, a procedure for mapping resources allocated to the PDSCH/PUSCH transmission region to the limited transmission region may be needed.

Method 3 can be applied to the TM-common DCI format and TM-dedicated DCI format. Alternatively, a DCI format size or a resource assignment bandwidth size can be set through higher layer signaling according to method 3 in the case of TM-dedicated DCI format, whereas the method of setting a DCI format size to the DCI format size set in the CoMP PCell can be applied to the TM-common DCI format (e.g. 1A) (more specifically, TM-common DCI format (e.g. 1A) set in a common search space (CSS) in the case of CoMP PCell) in consideration of backward compatibility with other existing DCI formats, prevention of increase in the number of blind decoding operations and RRC reconfiguration.

For example, the UE can perform blind decoding based on the DCI format size and/or the resource assignment bandwidth size set through RRC signaling irrespective of set DCI formats. When the UE recovers a DCI format payload from a PDCCH detected through blind decoding, if the DCI format size set through RRC signaling is greater than or equal to the actual DCI format size, then the UE can use only information corresponding to the actual DCI format size and abandon information corresponding to padded bits. Alternatively, when information predefined between the UE and the BS is inserted as padded bits, the UE can check an error using the padded bits (virtual CRC). If the DCI format size set through RRC signaling is less than the actual DCI format size, the UE can receive a PDSCH as allocated by the detected PDCCH although data is transmitted through a limited PDSCH transmission region in the bandwidth of the corresponding CoMP SCell.

FIG. 11 illustrates a method for transmitting control information by a transmission point according to the aforementioned methods (methods 1, 2 and 3). Referring to FIG. 11, the transmission point generates control information (e.g. DCI) regarding respective cells included in a CoMP set (S1110). The control information about the respective CoMP cells may be transmitted through a CoMP PCell (S1120). Here, the sizes of the control information about the CoMP cells may be set to the same value according to the above-described methods (methods 1, 2 and 3). According to method 1, the control information sizes can be set to a maximum size from among the control information sizes with respect to the CoMP cells. According to method 2, the control information sizes can be set to a DCI format size of the CoMP PCell. According to method 3, the control information sizes with respect to the respective CoMP cells can be set to a specific DCI format size and the DCI format size can be signaled to the UE through higher layer signaling (e.g. RRC signaling).

FIG. 12 illustrates a method for receiving control information by a UE according to the aforementioned methods (methods 1, 2 and 3). Referring to FIG. 12, the UE monitors PDCCH candidates for CoMP cells (S1210). The UE detects DCI by monitoring (blind-decoding) the PDCCH candidates (S1220). When the PDCCH candidates are monitored, the sizes of the PDCCH candidates are set to the same value according to one of the above-described methods (methods 1, 2 and 3). According to method 1, the sizes of the PDCCH candidates are set to the same value based on a maximum size from among the control information sizes with respect to the CoMP cells. According to method 2, the sizes of the PDCCH candidates are set to the same value based on the DCI format size of the CoMP PCell. According to method 3, the sizes of the PDCCH candidates are set to the same value based on a DCI format size signaled through higher layer signaling (e.g. RRC signaling).

Figure 13:
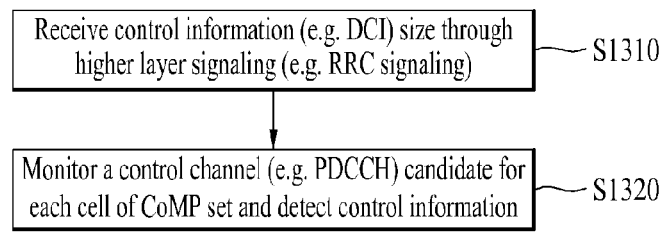

FIG. 13 is a flowchart illustrating a method for receiving control information by a UE according to method 3. Referring to FIG. 13, the UE is signaled the size of control information (e.g. DCI) through higher layer signaling (e.g. RRC signaling) (S1310). The UE detects the control information by monitoring control channel (e.g. PDCCH) candidates having the same size determined based on the signaled control information size (S1320).

The aforementioned methods (methods 1, 2 and 3) can be differently applied to the TM-common DCI format and TM-dedicated DCI format. For example, DCI format sizes for all CoMP cells are set to a maximum size or a DCI format size/bandwidth are set through higher layer signaling (e.g. RRC signaling) in the case of TM-dedicated DCI format (i.e. method 1 or 3 is applied), whereas DCI format sizes for all CoMP cells are determined as a size set for a CoMP PCell in the case of TM-common DCI format (i.e. method 2 is applied). In this case, the final sizes of the TM-common DCI format and TM-dedicated DCI format can be equal to each other by applying different methods to the TM-common DCI format and TM-dedicated DCI format. When two DCI formats have the same size, additional bit padding may be applied to one of the two DCI formats. Alternatively, only the DCI format set in the CoMP PCell may be transmitted/detected without using the aforementioned methods in the case of the TM-common DCI format because there is high possibility that the TM-common DCI format is used when channel state is not suitable for CoMP and spatial multiplexing. In other words, the TM-common DCI format for a CoMP set defines/permits only the DCI format set in the CoMP PCell and a PDSCH/PUSCH corresponding thereto can be transmitted through the CoMP PCell all the time.

Alternatively, bandwidths of CoMP cells grouped into a CoMP set may be set to the same value and transmission modes of the CoMP cells may be set to the same mode for a UE. Accordingly, DCI formats (payload sizes) set in all CoMP cells belonging to the CoMP set can be automatically set to the same format.

In addition, it is possible to consider a method of appropriately distributing M blind decoding operations to CoMP cells (DCI formats set in the CoMP cells) in order to maintain the M blind decoding operations per CoMP set without performing an additional operation (bit padding or bandwidth restriction) by applying the aforementioned methods (methods 1, 2 and 3) to the DCI formats respectively set in the CoMP cells. Specifically, 1) a search space (SS) is configured per CoMP cell included in a CoMP set as in the case of CA and blind decoding is performed only on part of PDCCH candidates corresponding to the search space (SS) (to detect the DCI format set in the CoMP cell corresponding to the SS) in order to maintain the number M of blind decoding operations for the CoMP or 2) only a single SS is configured for CoMP PCell scheduling, PDCCH candidates corresponding to the SS are appropriately divided into subsets, and blind decoding is performed to detect DCI formats set in different CoMP cells for the subsets.

Timing Related to PDSCH Scheduling

Considering a case in which a UE receives a PDCCH, which schedules a PDSCH transmitted in a CoMP SCell, through a CoMP PCell when CA based CoMP is applied, the UE may need to receive the PDCCH upon acquisition of time/frequency synchronization with the CoMP PCell and setting the number of DL antennas/RS configuration thereof to those of the CoMP PCell, and then receive the PDSCH upon acquisition of time/frequency synchronization with the CoMP SCell and setting the number of DL antennas/RS configuration thereof to those of the CoMP SCell. If the UE has an ability to simultaneously perform synchronization tracking and received signal processing for a plurality of cells, there is no problem in operation of the UE. If not (e.g. when the UE supports only a single synchronization tracking operation and a single received signal processing operation for all cells included in a CoMP set), a problem may occur in time/frequency synchronization and received signal buffering/demodulation.

For example, when the UE does not stably perform synchronization tracking with respect to the CoMP SCell while synchronization tracking is set to the CoMP PCell in the default mode and does not acquire correct synchronization of reception of a PDSCH transmitted in the CoMP SCell, inter-symbol interference (ISI) with respect to OFDM symbols and inter-carrier interference (ICI) may occur. In addition, buffering of the received PDSCH signal and delay in received signal demodulation may increase due to latency generated when the UE detects (blind-decodes) a PDCCH from the CoMP PCell and then synchronizes with the CoMP SCell and adjusts the number of DL antennas/RS configuration. To solve this, a method through which the UE can perform periodic synchronization tracking for all CoMP cells in a CoMP set and/or overhead of synchronization/ buffering/demodulation for PDSCH reception, performed after PDCCH detection (blind decoding) can be reduced may be needed.

Accordingly, the present invention proposes 1) configuration of a CoMP cell dedicated PDSCH subframe and/or 2) provision of an interval between PDCCH reception and PDSCH reception. In the case of 1), the UE can periodically perform synchronization tracking with respect to a corresponding cell using the subframe configured in the corresponding cell. In the case of 2), time/speed overhead with respect to synchronization and buffering/demodulation for a CoMP cell in which a PDSCH is transmitted can be reduced.

Method 4

The present method periodically configures a dedicated PDSCH subframe per CoMP cell belonging to a CoMP set (i.e. PDSCH scheduling can be performed in a subframe for the CoMP cell corresponding to the subframe from among CoMP cells included in the CoMP set) such that a UE performs synchronization tracking with respect to the corresponding CoMP cell and receives a PDSCH transmitted in the CoMP cell.

According to method 4, the UE can buffer/demodulate a received signal upon synchronization with a specific CoMP SCell in a dedicated PDSCH subframe of the CoMP SCell even when PDCCH decoding in a CoMP PCell has not been completed.

The CoMP PCell can be excluded from the target to which method 4 is applied since a signal reception operation according to PDCCH detection can be performed per subframe in the CoMP PCell.

According to method 4, the UE can receive scheduling information about a corresponding cell and a PDSCH according to the scheduling information through a dedicated PDSCH subframe periodically configured per CoMP cell.

Method 5

This method provides a predetermined time interval (e.g. K (≥1) subframes or M symbol intervals) between subframe/symbol timing of receiving a PDCCH through a CoMP PCell and subframe/symbol timing of receiving a PDSCH corresponding to the PDCCH through a CoMP cell belonging to the same CoMP set.

According to method 5, the UE can receive the PDCCH through the CoMP PCell in subframe #n, perform synchronization with respect to a CoMP SCell in which a PDSCH corresponding to the PDCCH is transmitted and then receive (buffer/demodulate) the PDSCH in subframe 3(n+k). Timing of transmitting ACK/NACK for the PDCCH can be delayed by K subframes (from the interval from when the PDCCH is received to when ACK/NACK for the PDCCH is transmitted in a conventional scheme). Otherwise, the UE can receive a PDCCH until symbol #n and receive a PDSCH corresponding to the PDCCH from symbol #(n+M) (or from designated PDSCH starting symbol+M symbols).

When a PDSCH is scheduled/received through the CoMP PCell, an additional synchronization process is not added and thus the CoMP PCell can be excluded from the target to which method 5 is applied (i.e. K=0 or M=0).

Alternatively, UEs to which CoMP schemes including the aforementioned CA based CoMP scheme may be limited to a UE having a specific CA ability. For example, the UEs can be limited to a UE having ability to aggregate CCs which belong to different frequency bands (which can refer to frequency bands having very wide frequency separation compared to BW of a CC). This is because there is high possibility that the UE having CA ability has ability to simultaneously perform synchronization tracking and received signal processing for a plurality of cells, as described above. For example, the UE having CA ability can perform synchronization tracking with respect to the CoMP SCell while decoding a PDCCH through a CoMP PCell.

The present invention has been described based on aggregation of CoMP cells. Data transmitted through each CoMP cell can be transmitted using one of specific parameter sets defined for CoMP operation. Accordingly, a CoMP cell can be replaced by a specific parameter set defined for CoMP operation in the above description.

The specific parameter set may include data-RE mapping information corresponding to a region or RE in which data is transmitted (or a region or RE excluded when data is received and/or a region or RE used for signals (e.g. RS resources such as CRS and/or CSI-RS) other than data) or information by which the data-RE mapping information can be inferred. In addition, the specific parameter set may include quasi-co-location (QCL) information indicating identity/similarity of geographical/physical positions of signals (e.g. RS)/channels (cells/points transmitting the channels) (or indicating which signals/channels (cells/points transmitting the channels) are assumed/considered by a UE to be quasi-co-located in terms of Doppler shift/spread and/or average delay/delay spread).

Figure 14:
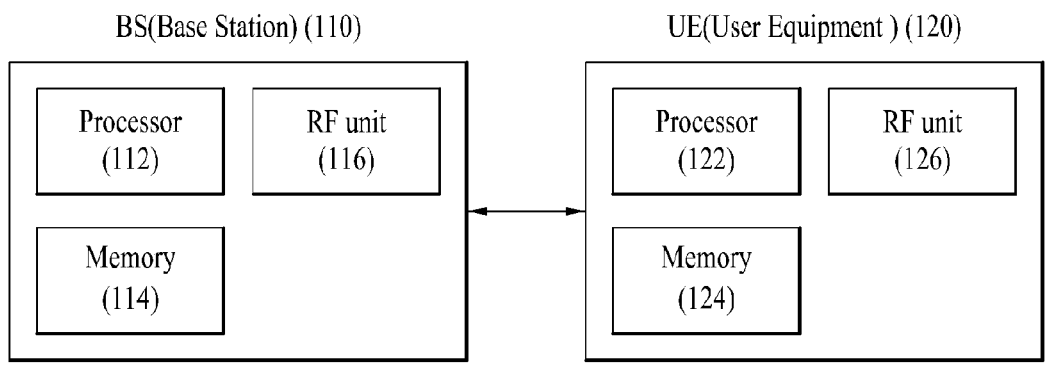
FIG. 14 illustrates a BS and a UE to which the present invention is applicable.

FIG. 14 illustrates a BS and a UE to which the present invention is applicable.

Referring to FIG. 14, a wireless communication system includes a BS 110 and a UE 120. When the wireless communication system includes a relay, the BS or UE can be replaced by the relay.

The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112, transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for wireless communication apparatuses such as a UE, eNB, etc.

The invention claimed is:

1. A method for receiving control information about a coordinated multi-point (CoMP) set by a user equipment from a serving transmission point in a carrier aggregation based wireless communication system, the CoMP set including a primary cell and a secondary cell, the method comprising:
   receiving information indicating control information size through higher layer signaling; and
   monitoring a plurality of control channel candidates for each cell of the CoMP set on the primary cell of the CoMP set and detecting the control information,
   wherein, when the control information corresponds to a transmission mode (TM) dedicated downlink control information (DCI) format, the plurality of control channel candidates for each cell of the CoMP set are determined to have a same information size as the control information size received through the higher layer signaling, and
   wherein, when the control information corresponds to a TM common DCI format, the plurality of control channel candidates for each cell of the CoMP set are determined to have a same information size as a DCI format size configured in the primary cell.

2. The method according to claim 1, wherein the control information is generated by padding bits when an actual size of the control information is smaller than the determined same information size.

3. The method according to claim 2, further comprising:
   checking an error of the detected control information using the padded bits when the actual size of the control information is smaller than the determined same information size.

4. The method according to claim 1, further comprising receiving data through the second cell on the basis of the control information,
   wherein the data is transmitted using a part of an entire bandwidth of the second cell when the actual size of the control information is greater than the determined same information size.

5. The method according to claim 1, wherein the control information is downlink control information (DCI) and the control channel candidates are physical downlink control channel (PDCCH) candidates.

6. The method according to claim 1, wherein the higher layer signaling corresponds to radio resource control (RRC) signaling.

7. A user equipment (UE) configured to receive control information about a coordinated multi-point (CoMP) set from a serving transmission point in a carrier aggregation based wireless communication system, the CoMP set including a primary cell and a secondary cell, the UE comprising:
   a processor; and
   a radio frequency (RF) module,
   wherein the processor is configured to receive information indicating control information size through higher layer signaling, monitor a plurality of control channel candidates for each cell of the CoMP set on the primary cell of the CoMP set and detect the control information,
   wherein, when the control information corresponds to a transmission mode (TM) dedicated downlink control information (DCI) format, the plurality of control channel candidates for each cell of the CoMP are determined to have a same information size as the control information size received through the higher layer signaling, and
   wherein, when the control information corresponds to a TM common DCI format, the plurality of control channel candidates for each cell of the CoMP set are determined to have a same information size as a DCI format size configured in the primary cell.

8. The UE according to claim 7, wherein the control information is generated by padding bits when an actual size of the control information is smaller than the determined same information size.

9. The UE according to claim 8, wherein the processor is further configured to check an error of the detected control information using the padded bits when the actual size of the control information is smaller than the determined same information size.

10. The UE according to claim 7, wherein the processor is further configured to receive data through the second cell on the basis of the control information,
   wherein the data is transmitted using a part of an entire bandwidth of the second cell when the actual size of the control information is greater than the determined same information size.

11. The UE according to claim 7, wherein the control information corresponds to downlink control information (DCI) and the control channel candidates are physical downlink control channel (PDCCH) candidates.

12. The UE according to claim 7, wherein the higher layer signaling corresponds to radio resource control (RRC) signaling.

* * * * *